United States Patent
Zhan et al.

(10) Patent No.: US 12,174,401 B2
(45) Date of Patent: Dec. 24, 2024

(54) OPTICAL LENS

(71) Applicant: GENIUS ELECTRONIC OPTICAL (XIAMEN) CO., LTD., Fujian (CN)

(72) Inventors: Haibin Zhan, Fujian (CN); Weiwei Fu, Fujian (CN); Ziwen Xu, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 1037 days.

(21) Appl. No.: 17/128,205

(22) Filed: Dec. 21, 2020

(65) Prior Publication Data
US 2022/0155499 A1 May 19, 2022

(30) Foreign Application Priority Data
Nov. 13, 2020 (CN) .......................... 202011269569.X (51) Int. Cl.
*G02B 5/00* (2006.01)
*G02B 7/02* (2021.01)

(52) U.S. Cl.
CPC ............. *G02B 5/003* (2013.01); *G02B 5/005* (2013.01); *G02B 7/021* (2013.01)

(58) Field of Classification Search
CPC .......... G02B 7/02; G02B 7/021; G02B 7/022; G02B 7/023; G02B 7/025; G02B 7/026; G02B 7/027; G02B 7/028; G02B 5/005; G02B 5/003; H04N 23/55; H04N 23/54; H04N 23/51
See application file for complete search history.

(56) References Cited

U.S. PATENT DOCUMENTS

| | | | | |
|---|---|---|---|---|
| 8,985,789 | B2 * | 3/2015 | Cho .................... | G02B 27/0018 359/740 |
| 10,126,529 | B2 * | 11/2018 | Chou ..................... | G02B 7/022 |
| 10,444,464 | B2 * | 10/2019 | Lin .......................... | G02B 1/14 |
| 10,564,383 | B2 * | 2/2020 | Chou ................ | G02B 27/0018 |
| 2004/0120046 | A1 * | 6/2004 | Shirie .................. | G02B 13/001 359/601 |
| 2009/0185291 | A1 * | 7/2009 | Tsuchiya ................ | G02B 7/025 359/738 |
| 2014/0104691 | A1 * | 4/2014 | Chang .................... | G02B 7/021 359/611 |

(Continued)

FOREIGN PATENT DOCUMENTS

WO WO-2014156954 A1 * 10/2014 ........... G02B 13/004

*Primary Examiner* — Ephrem Z Mebrahtu
(74) *Attorney, Agent, or Firm* — JCIPRNET (57) ABSTRACT

An optical lens including a light-shielding sheet and a spacer sequentially arranged along an optical axis from a first side to a second side is provided. No other element is disposed between the light-shielding sheet and the spacer. A second side surface of the light-shielding sheet includes a first surface. A first side surface of the spacer includes an abutting surface and a connecting surface connected to each other, and the connecting surface has a protrusion portion. A cross-sectional line of the abutting surface of the spacer in a radial direction is a straight line and abuts against the first surface of the light-shielding sheet, and an abutment between the abutting surface and the first surface falls on a first reference plane. The light-shielding sheet and a most protruding portion of the protrusion portion are located on a same side of the first reference plane.

19 Claims, 6 Drawing Sheets

(56) References Cited

U.S. PATENT DOCUMENTS

| | | | |
|---|---|---|---|
| 2015/0234145 A1* | 8/2015 | Chang | G02B 7/022 359/811 |
| 2017/0010434 A1* | 1/2017 | Chou | G02B 7/021 |
| 2019/0238735 A1* | 8/2019 | Wei | H04N 23/55 |
| 2021/0223499 A1* | 7/2021 | Feng | G02B 5/223 |
| 2022/0128787 A1* | 4/2022 | Liu | G02B 5/003 |

* cited by examiner

OPTICAL LENS

CROSS-REFERENCE TO RELATED APPLICATION

This application claims the priority benefit of China application serial no. 202011269569.X, filed on Nov. 13, 2020. The entirety of the above-mentioned patent application is hereby incorporated by reference herein and made a part of this specification.

BACKGROUND

Technical Field

The disclosure relates to an optical device, and in particular, to an optical lens.

Description of Related Art

A light-shielding sheet may be disposed between lens elements to block stray light, so that the stray light is prevented from entering the imaging plane, and optical imaging quality is thereby prevented from being affected. Further, in an optical lens, the optical boundary between adjacent lens elements may be excessively far, a spacer is thus required to be disposed between the assembly portions of lens elements in the most of the time, so that an appropriate distance may be kept between the lens elements. Allowing a light-shielding sheet together with a spacer to be sandwiched between the lens elements during assembly is a common means. Nevertheless, the light-shielding sheet is thin and has a short inner diameter, the light-shielding sheet may be easily warped in the opposite direction of abutting against the lens element when being applied by a force or is heated. The inner diameter is thereby changed, and the effect of stray light blockage provided by the light-shielding sheet is affected.

SUMMARY

The disclosure provides an optical lens capable of addressing the problem of inner diameter size change of a light-shielding sheet caused by light-shielding sheet warpage.

An embodiment of the disclosure provides an optical lens including a light-shielding sheet and a spacer sequentially arranged along an optical axis from a first side to a second side. No other element is disposed between the light-shielding sheet and the spacer. Each of the light-shielding sheet and the spacer includes a first side surface facing the first side and a second side surface facing the second side. The second side surface of the light-shielding sheet includes a first surface. The first side surface of the spacer includes an abutting surface and a connecting surface connected to each other, and the connecting surface has a protrusion portion. A cross-sectional line of the abutting surface of the spacer in a radial direction is a straight line and abuts against the first surface of the light-shielding sheet, and an abutment between the abutting surface and the first surface falls on a first reference plane. The light-shielding sheet and a most protruding portion of the protrusion portion are located on a same side of the first reference plane.

An embodiment of the disclosure provides an optical lens including a light-shielding sheet and a spacer sequentially arranged along an optical axis from a first side to a second side. No other element is disposed between the light-shielding sheet and the spacer. Each of the light-shielding sheet and the spacer includes a first side surface facing the first side and a second side surface facing the second side. The second side surface of the light-shielding sheet includes a first surface. The first side surface of the spacer includes an abutting surface and a connecting surface connected to each other, and the connecting surface has a protrusion portion. A cross-sectional line of the abutting surface of the spacer in a radial direction is a straight line and abuts against the first surface of the light-shielding sheet. The optical lens satisfies the following conditional expression: $L/D1 \geq 1.020$, where L is a minimum distance between the abutting surface and the optical axis, and D1 is a minimum distance between a most protruding portion of the protrusion portion and the optical axis.

To sum up, in the optical lens provided by the embodiments of the disclosure, the light-shielding sheet and the most protruding portion of the protrusion portion of the spacer are located on the same side of the first reference plane. In this way, when the optical lens is assembled, if the light-shielding sheet is warped in the opposite direction of abutting against the lens element when being applied by a force or is heated, the spacer may appropriately provide the light-shielding sheet with a force in the direction of abutting against the lens element to guide the light-shielding sheet. As such, redundant stray light is prevented from entering the imaging plane owing to a size change of the inner diameter of the light-shielding sheet, and that optical imaging quality is prevented from being affected.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
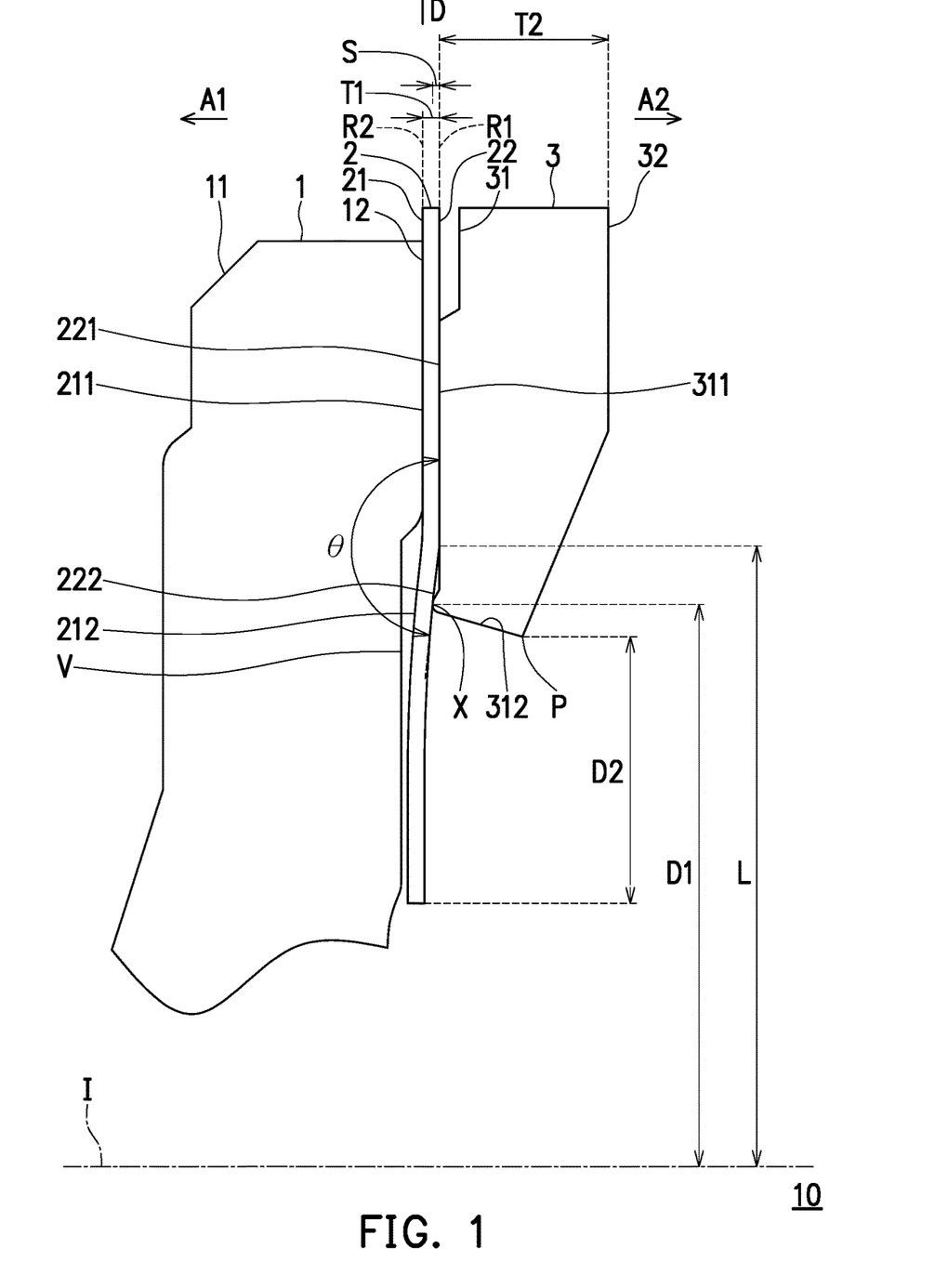
FIG. 1 is a schematic view of an optical lens according to a first embodiment of the disclosure.

FIG. 1 is a schematic view of an optical lens according to a first embodiment of the disclosure. With reference to FIG. 1, an optical lens 10 provided by an embodiment of the disclosure includes a light-shielding sheet 2 and a spacer 3 sequentially arranged along an optical axis I from a first side A1 to a second side A2. In this embodiment, the first side A1 is an object side or a light exit side, and the second side A2 is an image side or a light incident side. Taking FIG. 1 as an example, when the optical lens 10 is an optical imaging lens, the first side A1 may be the object side, and the second side A2 may be the image side. Further, the optical lens 10 is configured to allow imaging rays to pass through to be imaged on an imaging plane located on the second side A2. When the optical lens 10 is a projection lens or an optical lens of structural light, the first side A1 and the second side A2 may respectively be, but not limited to, the light exit side and the light incident side. In this way, rays are emitted from a light source located on the second side A2 and generate a plurality of imaging rays with different exit angles after passing through the optical lens 10. Or vice versa, the first side A1 may be the image side or the light incident side, and the second side A2 may be the object side or the light exit side.

In this embodiment, the light-shielding sheet 2 and the spacer 3 respectively include first side surfaces 21 and 31 facing the first side A1 and second side surfaces 22 and 32 facing the second side A2. The second side surface 22 of the light-shielding sheet 2 includes a first surface 221, and the second side surface 22 further includes a second surface 222 connected to the first surface 221. The first side surface 21 of the light-shielding sheet 2 includes a third surface 211 and a fourth surface 212 connected to each other. Note that facing the first side A1 refers to that an angle included between a direction that the surface faces and a direction of the first side A1 is less than 90 degrees. That is, directly facing the first side A1 and obliquely facing the first side A1 are both treated as facing the first side A1. Nevertheless, facing away from the first side A1, obliquely facing away from the first side A1, and forming a 90-degree angle included between the direction that the surface faces and the direction of the first side A1, these three situations cannot be interpreted as facing the first side A1. Similarly, facing the second side A2 refers to that an angle included between the direction that the surface faces and a direction of the second side A2 is less than 90 degrees. That is, directly facing the second side A2 and obliquely facing the second side A2 are both treated as facing the second side A2. Nevertheless, facing away from the second side A2, obliquely facing away from the second side A2, and forming a 90-degree angle included between the direction that the surface faces and the direction of the second side A2, these three situations cannot be interpreted as facing the second side A2.

In this embodiment, the first side surface 31 of the spacer 3 includes an abutting surface 311 and a connecting surface 312 connected to each other, and the connecting surface 312 has a protrusion portion X. The spacer 3 has an inner periphery P located at a position closest to the optical axis I. The inner periphery P and the connecting surface 312 are connected to each other. That is, the inner periphery P is a surface boundary of the spacer 3 between the first side surface 31 and the second side surface 32, i.e., an edge of a perforation at a center of the spacer 3.

In this embodiment, the optical lens 10 further includes a lens element 1. The lens element 1 includes a first side surface 11 facing the first side A1 and a second side surface 12 facing the second side A2. The light-shielding sheet 2 is disposed between the lens element 1 and the spacer 3. The lens element 1 has an optical effective region, which surrounds the optical axis I, includes the optical axis I, and allows the imaging rays to pass through, and an optical ineffective region, which surrounds the optical axis I, is away from the optical axis I, and without imaging rays to pass through. The optical ineffective region and the optical effective region of the lens element 1 are connected to each other.

In this embodiment, the light-shielding sheet 2 is disposed on the optical ineffective region of the lens element 1 and is configured to shield stray light. The spacer 3 is disposed on the optical ineffective region the lens element 1 as well and is configured to enable the designed distances among elements of the optical lens 10 to be kept.

In this embodiment, no other element is disposed between the light-shielding sheet 2 and the spacer 3, and stray light may be effectively shielded in this way. The third surface 211 of the light-shielding sheet 2 abuts against the second side surface 12 of the lens element 1, and the abutting surface 311 of the spacer 3 abuts against the first surface 221 of the light-shielding sheet 2.

To be specific, a cross-sectional line of the abutting surface 311 of the spacer 3 in a radial direction D is a straight line, and an abutment between the abutting surface 311 and the first surface 221 of the light-shielding sheet 2 falls on a first reference plane R1. A junction of the first surface 221 and the second surface 222 has an included angle $\theta$, and the included angle $\theta$ is less than 180 degrees. That is, the second surface 222 is inclined with respect to the first reference plane R1 near the junction with the first surface 221. Further, a portion of the second surface 222 away from the junction of the first surface 221 and the second surface 222 is approximately parallel to the first reference plane R1. In this embodiment, a most protruding portion of the protrusion portion X and the light-shielding sheet 2 are located on a same side of the first reference plane R1. That is, the most protruding portion of the protrusion portion X is closer to the first side A1 than the first reference plane R1.

In this embodiment, an abutment between the third surface 211 of the light-shielding sheet 2 and the second side surface 12 of the lens element 1 falls on a second reference plane R2. Further, a junction of the third surface 211 and the fourth surface 212 has the included angle $\theta$. That is, the fourth surface 212 is inclined with respect to the second reference plane R2 near the junction with the third surface 211.

In this embodiment, the second side surface 12 of the lens element 1 includes a concave portion V. With respect to the second reference plane R2, the concave portion V is concave on the second side surface 12. The concave portion V of the lens element 1 receives a portion of the light-shielding sheet 2 corresponding to the fourth surface 212.

In this embodiment, a portion of the fourth surface 212 of the light-shielding sheet 2 closest to the optical axis I is located on one side of the second reference plane R2 facing the first side A1. Further, a distance between the fourth surface 212 and the lens element 1 in a normal direction is greater than 0. That is, the fourth surface 212 of the light-shielding sheet 2 does not contact with the second side surface 12 of the lens element 1. As such, when the protrusion portion X of the connecting surface 312 of the spacer 3 provides the light-shielding sheet 2 with a force in a direction of abutting against the lens element 1, the concave portion V of the lens element 1 does not interfere with the light-shielding sheet 2, such that the lens element 1 is prevented from providing the light shielding sheet 2 with another force in a direction of the spacer 3 to cause the light shielding sheet 2 to be warped again.

In this embodiment, in a direction of the optical axis I, a distance between a portion of the fourth surface 212 of the light-shielding sheet 2 corresponding to the protrusion portion X of the spacer 3 and the second side surface 12 of the lens element 1 is greater than 0. That is, such portion of the fourth surface 212 does not contact the second side surface 12 of the lens element 1. As such, when the protrusion portion X of the connecting surface 312 of the spacer 3 provides the light-shielding sheet 2 with a force in the direction of abutting against the lens element 1, a space (i.e., the concave portion V) is kept by the lens element 1 without interfering with the light-shielding sheet 2, such that the lens element 1 is prevented from providing the light shielding sheet 2 with another force in the direction of the spacer 3 to cause the light shielding sheet 2 to be warped again.

In this embodiment, the first reference plane R1 and the second reference plane R2 are perpendicular to the optical axis I.

In this embodiment, a shortest distance between the protrusion portion X of the spacer 3 and the abutting surface 311 is greater than 0. That is, the protrusion portion X is not directly connected to the abutting surface 311. A distance between the abutting surface 311 and the most protruding portion of the protrusion portion X acting as pivots of each other is long, and a supporting force provided by the spacer 3 to prevent the light-shielding sheet 2 from being deformed is considerable, such that an inner diameter of the light-shielding sheet 2 may not be easily changed. The protrusion portion X of the spacer 3 contacts the light-shielding sheet 2, and the protrusion portion X abuts against the second surface 222 of the light-shielding sheet 2. Since the protrusion portion X of the spacer 3 contacts the light-shielding sheet 2, the light-shielding sheet 2 is continuously subjected to a force in the direction of abutting against the lens element 1. In this way, a level of warpage of the light-shielding sheet 2 when being applied by a force during assembly or is heated may be further lowered, and assembly yield may thus be further improved.

In this embodiment, when a maximum thickness T1 of the light-shielding sheet 2 in the direction of the optical axis I is less than a maximum thickness T2 of the spacer 3 in the direction of the optical axis I, the stray light may be favorably shielded, and a distance between lenses may be appropriately separated.

Based on the above, in an embodiment of the disclosure, the optical lens 10 is provided with the light-shielding sheet 2 and the spacer 3, and the light-shielding sheet 2 and the most protruding portion of the protrusion portion X of the spacer 3 are located on the same side of the first reference plane R1. In this way, when the optical lens 10 is assembled, if the light-shielding sheet 2 is warped in an opposite direction (i.e., a direction towards the second side A2) of abutting against the lens element 1 when being applied by a force or is heated, the spacer 3 may appropriately provide the light-shielding sheet 2 with a force in the direction of abutting against the lens element 1. As such, redundant stray light is prevented from entering the imaging plane owing to a size change of the inner diameter caused by warpage of the light-shielding sheet 2, and that optical imaging quality is prevented from being affected. In other words, since the optical lens 10 satisfies the foregoing design, the spacer 3 may act as an obstacle in advance in another direction of the light-shielding sheet 2 abutting against the lens element 1. In this way, when the light-shielding sheet 2 is deformed when being applied by a force or is heated, the light-shielding sheet 2 may be appropriately guided back to the direction of abutting against the lens element 1, and that imaging quality is prevented from being affected.

In addition, in an embodiment of the disclosure, the optical lens 10 is provided with the light-shielding sheet 2 and the spacer 3. Further, the optical lens 10 satisfies the following conditional expression: L/D1≥1.020, where L is a minimum distance between the abutting surface 311 and the optical axis I, D1 is a minimum distance between the most protruding portion of the protrusion portion X and the optical axis I, and the preferable range is 1.020≤L/D1≤1.500. It thus can be seen that the spacer 3 may act as an obstacle in advance in an opposite direction of the light-shielding sheet 2 abutting against the lens element 1, such that when the light-shielding sheet 2 is deformed when being applied by a force or is heated, the light-shielding sheet 2 may be appropriately guided back to the direction of abutting against the lens element 1, and that imaging quality is prevented from being affected. Moreover, by controlling the minimum distance D1 between the most protruding portion of the protrusion portion X and the optical axis I, the light-shielding sheet 2 may be precisely guided. That is, excessively long or excessively short distance D1 may prevent the spacer 3 from providing the correct torque to guide the light-shielding sheet 2 back to the designed position.

Further, in this embodiment, the optical lens 10 satisfies the following conditional expression: D2/S≥20.000, where D2 is a distance between the inner periphery P of the spacer 3 and a position of the light-shielding sheet 2 closest to the optical axis I in a direction perpendicular to the optical axis, S is a distance between the most protruding portion of the protrusion portion X and the abutting surface 311 in the direction of the optical axis I, and the preferable range is 20.000≤D2/S≤300.000. When the optical lens 10 satisfies the foregoing condition, the protrusion portion X of the connecting surface 312 of the spacer 3 may provide a sufficient force in the direction of abutting against the lens element 1 to adjust the warpage of the light-shielding sheet 2 smoothly.

Figure 2:
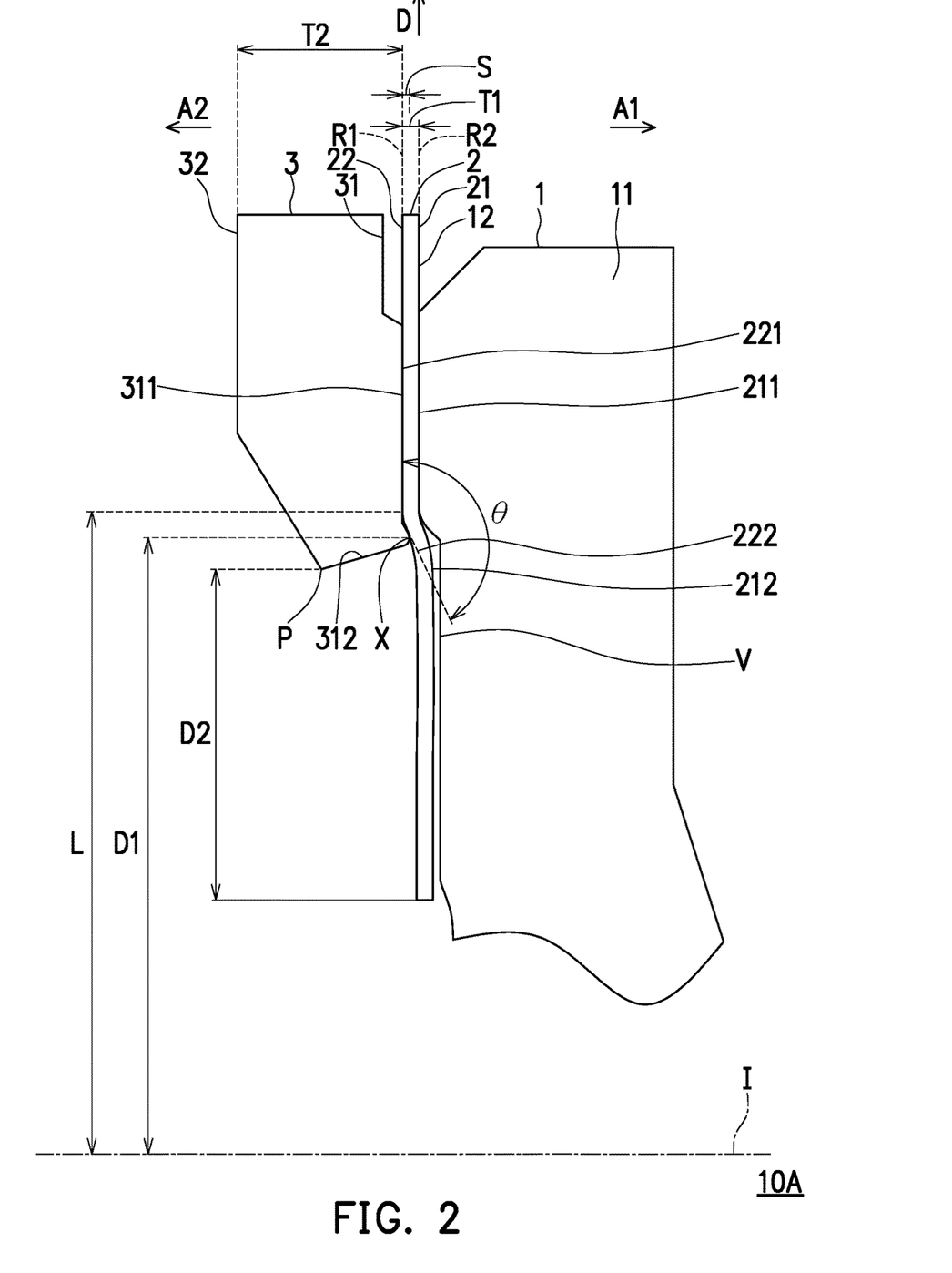
FIG. 2 is a schematic view of an optical lens according to a second embodiment of the disclosure.

FIG. 2 is a schematic view of an optical lens according to a second embodiment of the disclosure. With reference to FIG. 2, an optical lens 10A in FIG. 2 is similar to the optical lens 10 in FIG. 1, and a difference therebetween is that: the first side A1 is an image side or a light incident side, and the second side A2 is an object side or a light exit side in this embodiment, but not limited thereto. The first side A1 may be an object side or a light exit side, and the second side A2 may be an image side or a light incident side. The protrusion portion X of the spacer 3 and the abutting surface 311 are connected to each other. That is, the protrusion portion X is located at a position of the connecting surface 312 where the maximum distance between the connecting surface 312 and the inner periphery P is provided. An effect generated by the optical lens 10A provided by an embodiment of the disclosure is similar to that generated by the optical lens 10, and description thereof is not repeated herein.

Figure 3:
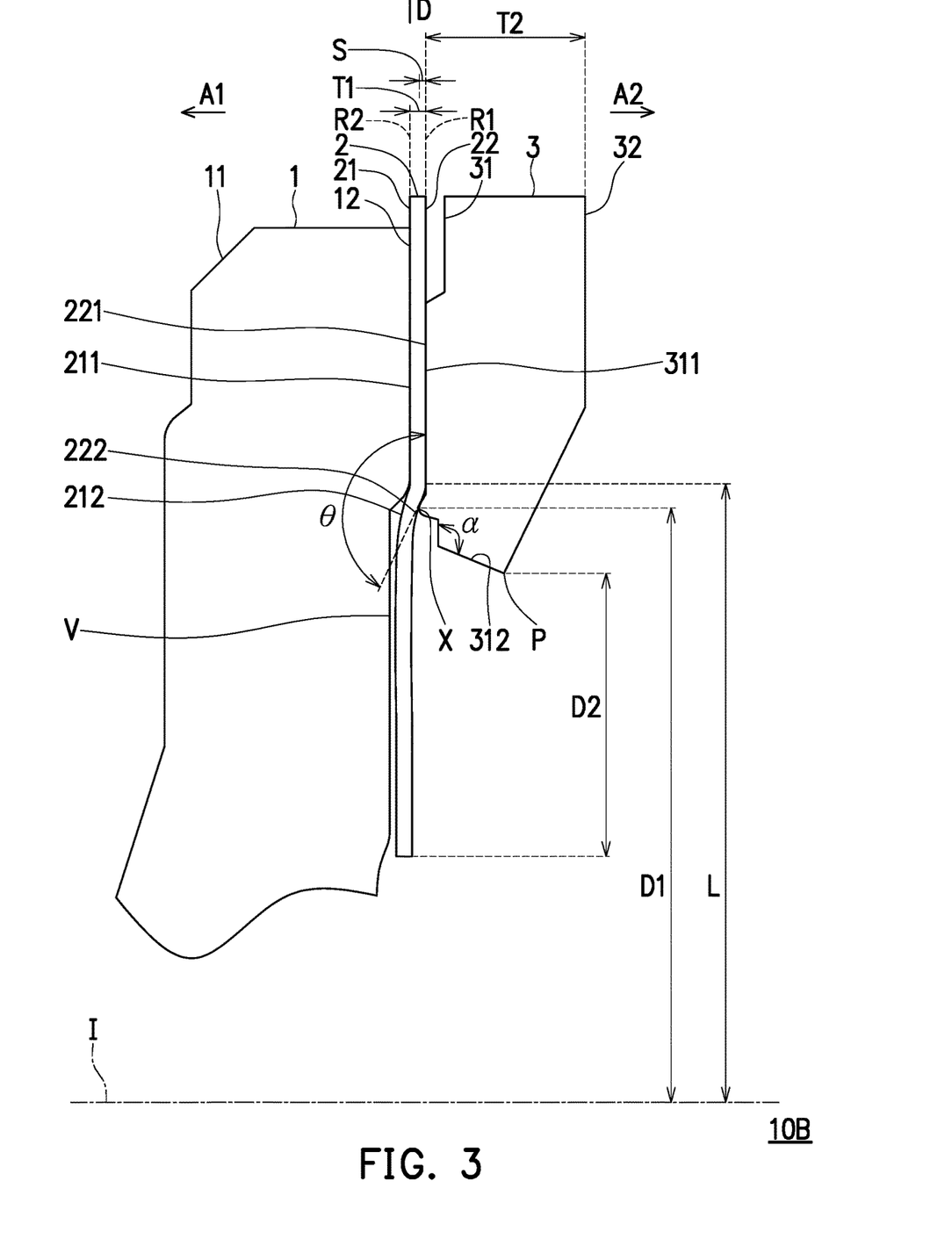
FIG. 3 is a schematic view of an optical lens according to a third embodiment of the disclosure.

FIG. 3 is a schematic view of an optical lens according to a third embodiment of the disclosure. With reference to FIG. 3, an optical lens 10B in FIG. 3 is similar to the optical lens 10 in FIG. 1, and a difference therebetween is that: the protrusion portion X of the spacer 3 and the abutting surface 311 are connected to each other. That is, the protrusion portion X is located at the position of the connecting surface 312 where the maximum distance between the connecting surface 312 and the inner periphery P is provided, and a chamfer α is provided between the protrusion portion X and the inner periphery P, so that processing and molding may thus be easily performed. An effect generated by the optical lens 10B provided by an embodiment of the disclosure is similar to that generated by the optical lens 10, and description thereof is not repeated herein.

Figure 4:
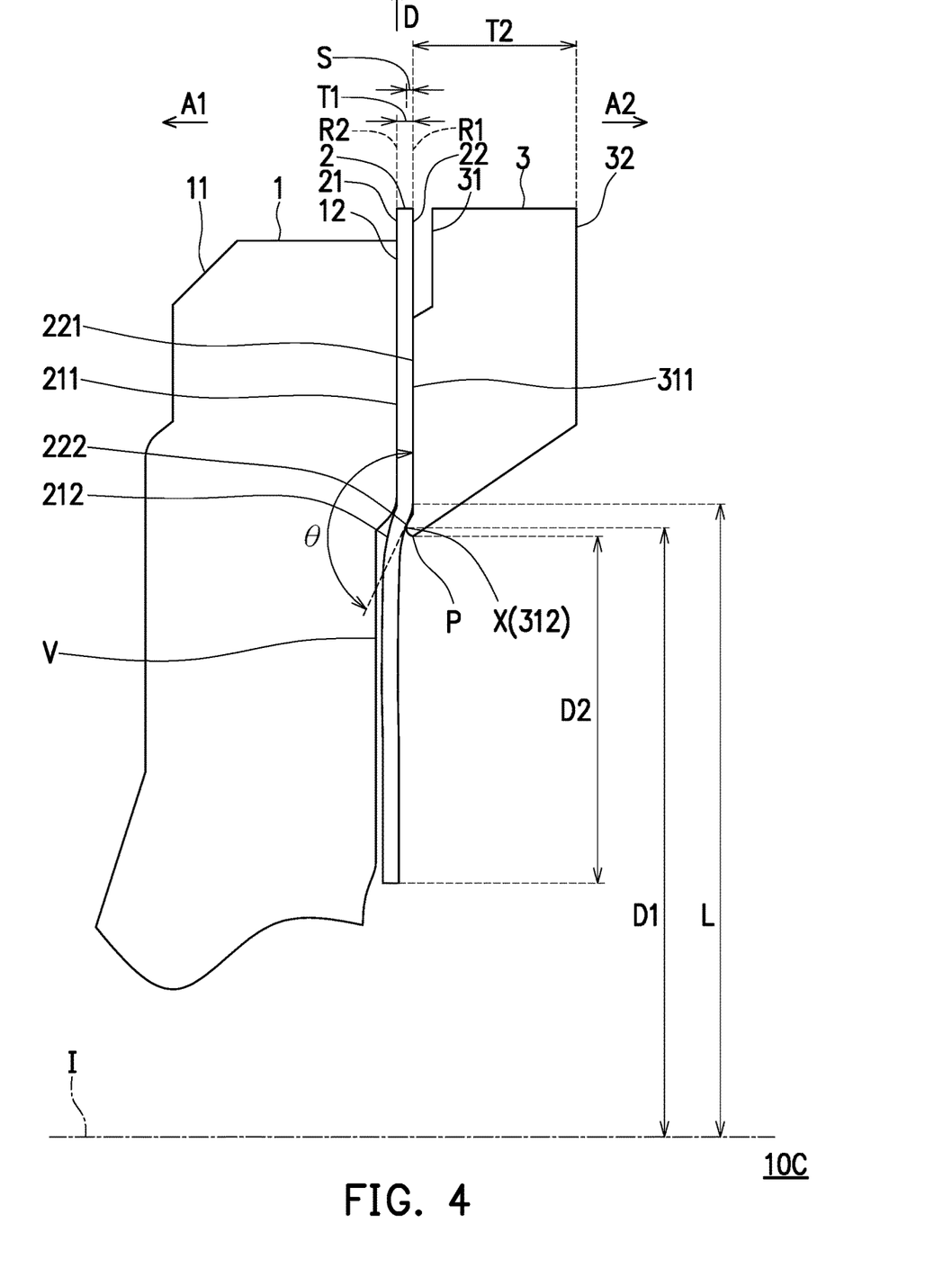
FIG. 4 is a schematic view of an optical lens according to a fourth embodiment of the disclosure.

FIG. 4 is a schematic view of an optical lens according to a fourth embodiment of the disclosure. With reference to FIG. 4, an optical lens 10C in FIG. 4 is similar to the optical lens 10 in FIG. 1, and a difference therebetween is that: the protrusion portion X of the spacer 3 and the inner periphery P are connected to each other. As such, an overall volume of the spacer 3 is reduced, and costs of the optical lens 10C are thereby lowered. An effect generated by the optical lens 10C provided by an embodiment of the disclosure is similar to that generated by the optical lens 10, and description thereof is not repeated herein.

Figure 5:
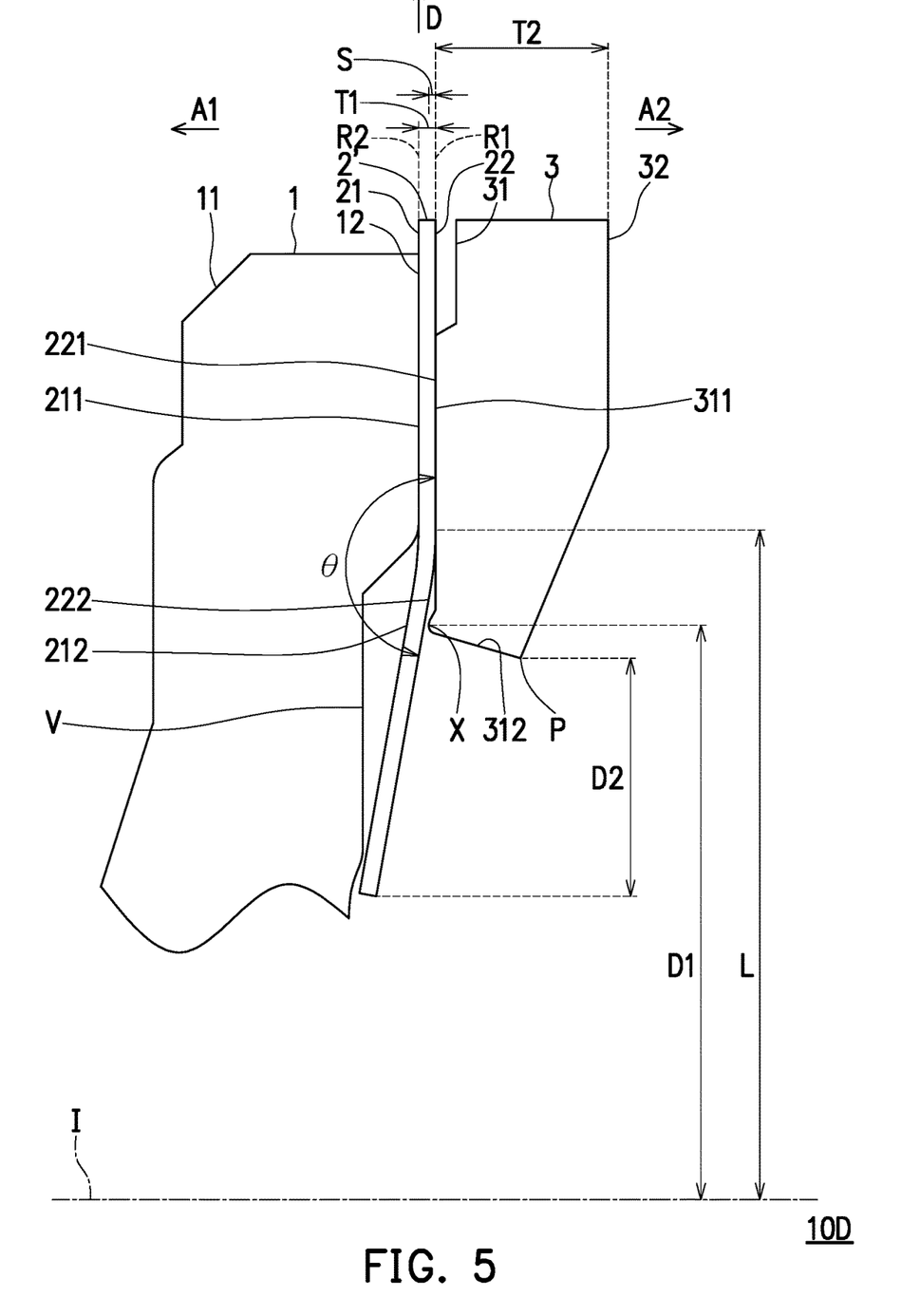
FIG. 5 is a schematic view of an optical lens according to a fifth embodiment of the disclosure.

FIG. 5 is a schematic view of an optical lens according to a fifth embodiment of the disclosure. With reference to FIG. 5, an optical lens 10D in FIG. 5 is similar to the optical lens 10 in FIG. 1, and a difference therebetween is that: a shortest distance between a second surface of a light-shielding sheet 2' and the protrusion portion X of the spacer 3 is greater than 0 in this embodiment. That is, the protrusion portion X of the spacer 3 does not contact the light-shielding sheet 2' and acts as an obstacle in advance in an opposite direction of the light-shielding sheet 2' abutting against the lens element 1. In this way, when the light-shielding sheet 2' is deformed when being applied by a force or is heated, the light-shielding sheet 2' may be appropriately guided back to the direction of abutting against the lens element 1. In addition, the junction of the first surface 221 and the second surface 222 of the light-shielding sheet 2' has the included angle θ, and the included angle θ is also provided between the portion of the second surface 222 away from the junction and the first surface 221. In this way, the light-shielding sheet 2' is shaped as a > shape, and stray light may thus be precisely shielded. An effect generated by the optical lens 10D provided by an embodiment of the disclosure is similar to that generated by the optical lens 10, and description thereof is not repeated herein.

Figure 6:
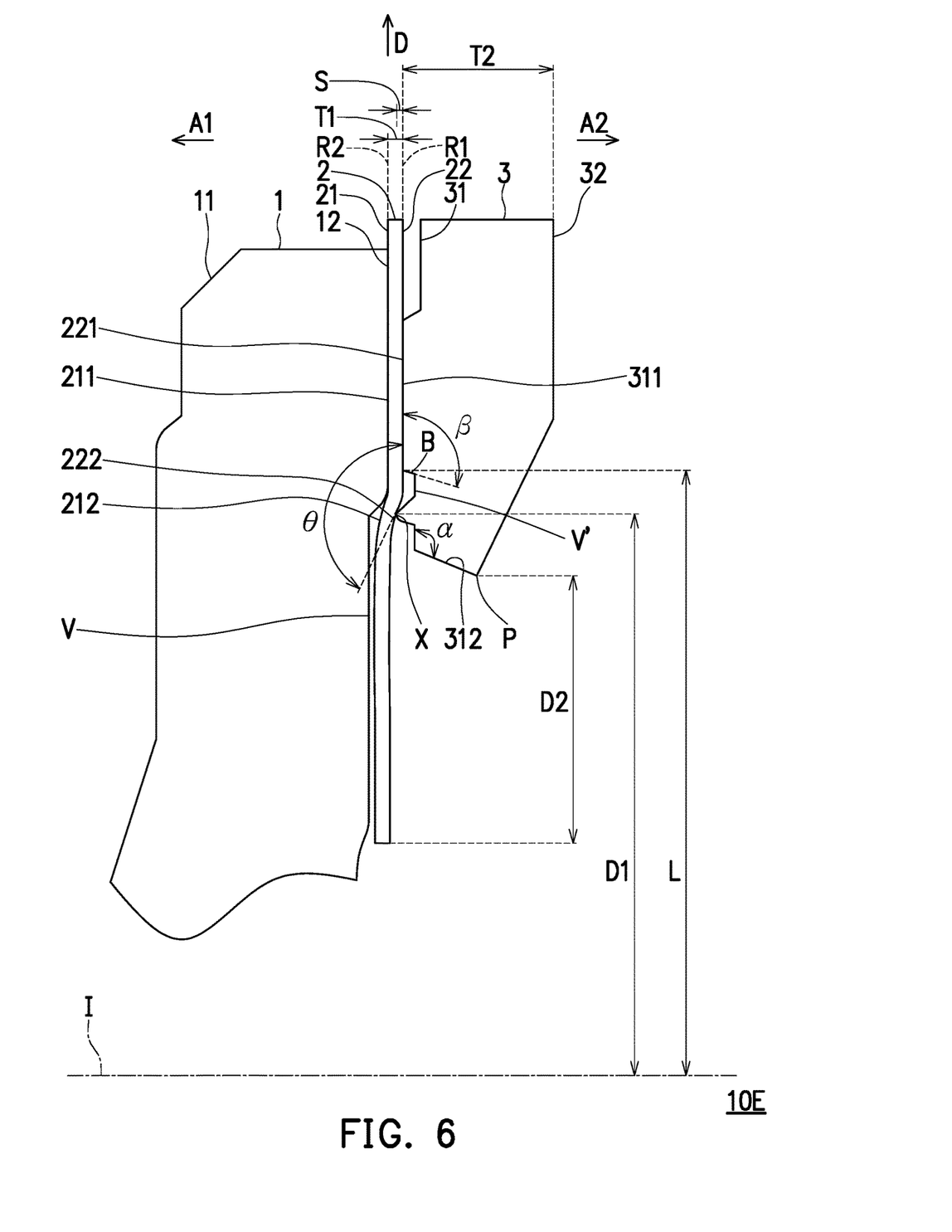
FIG. 6 is a schematic view of an optical lens according to a sixth embodiment of the disclosure.

FIG. 6 is a schematic view of an optical lens according to a sixth embodiment of the disclosure. With reference to FIG. 6, an optical lens 10E in FIG. 6 is similar to the optical lens 10 in FIG. 1, and a difference therebetween is that: the connecting surface 312 of the spacer 3 further includes a concave portion V' and a bevel surface B between the protrusion portion X and the abutting surface 311 in this embodiment. With respect to the first reference plane R1, the concave portion V' is concave on the first side surface 31. Moreover, the bevel surface B is connected to the concave portion V' and the abutting surface 311, the bevel surface B and the abutting surface 311 form a chamfer β, and a chamfer α is also provided between the protrusion portion X and the inner periphery P, so that processing and molding may thus be easily performed. An effect generated by the optical lens 10E provided by an embodiment of the disclosure is similar to that generated by the optical lens 10, and description thereof is not repeated herein.

In view of the foregoing, the optical lens provided by the embodiments of the disclosure is able to render the following effects and advantages.

1. The optical lens is provided with the light-shielding sheet and the spacer, and no other element is disposed between the light-shielding sheet and the spacer. The first side surface of the spacer includes the abutting surface and the connecting surface connected to each other, and the connecting surface has the protrusion portion. The cross-sectional line of the abutting surface of the spacer in the radial direction is a straight line and abuts against the first surface of the light-shielding sheet, and the abutment between the abutting surface and the first surface falls on the first reference plane. The most protruding portion of the protrusion portion of the spacer and the light-shielding sheet are located on the same side of the first reference plane. In this way, when the optical lens is assembled, if the light-shielding sheet is warped in the opposite direction of abutting against the lens element when being applied by a force or is heated, the spacer may appropriately provide the light-shielding sheet with a force in the direction of abutting against the lens element. As such, redundant stray light is prevented from entering the imaging plane owing to a size change of the inner diameter caused by warpage of the light-shielding sheet, and that optical imaging quality is prevented from being affected.

2. The optical lens is provided with the light-shielding sheet and the spacer, and no other element is disposed between the light-shielding sheet and the spacer. The first side surface of the spacer includes the abutting surface and the connecting surface connected to each other, and the connecting surface has the protrusion portion. The cross-sectional line of the abutting surface of the spacer in the radial direction is a straight line and abuts against the first surface of the light-shielding sheet. Further, the optical lens satisfies the following conditional expression: $L/D1 \geq 1.020$. As such, the spacer may act as an obstacle in advance in the opposite direction of the light-shielding sheet abutting against the lens element, such that when the light-shielding sheet is deformed when being applied by a force or is heated, the light-shielding sheet may be appropriately guided back to the direction of abutting against the lens element, and that imaging quality is prevented from being affected. Moreover, by controlling the minimum distance D1 between the protrusion portion and the optical axis, the light-shielding sheet may be precisely guided.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical lens, comprising a light-shielding sheet and a spacer sequentially arranged along an optical axis from a first side to a second side, wherein no other element is disposed between the light-shielding sheet and the spacer, and each of the light-shielding sheet and the spacer comprises a first side surface facing the first side and a second side surface facing the second side, wherein
   the second side surface of the light-shielding sheet comprises a first surface,
   the first side surface of the spacer comprises an abutting surface and a connecting surface connected to each other, wherein the connecting surface has a protrusion portion,
   a cross-sectional line of the abutting surface of the spacer in a radial direction is a straight line and abuts against the first surface of the light-shielding sheet, an abutment between the abutting surface and the first surface falls on a first reference plane,
   the light-shielding sheet and a most protruding portion of the protrusion portion are located on a same side of the first reference plane, and
   the optical lens satisfies the following conditional expression: $L/D1 \geq 1.020$, wherein L is a minimum distance between the abutting surface and the optical axis, and D1 is a minimum distance between the most protruding portion of the protrusion portion and the optical axis.

2. The optical lens according to claim 1, wherein the first reference plane is perpendicular to the optical axis.

3. The optical lens according to claim 1, wherein the first side is an object side or a light exit side, and the second side is an image side or a light incident side.

4. The optical lens according to claim 1, wherein the first side is an image side or a light incident side, and the second side is an object side or a light exit side.

5. The optical lens according to claim 1, wherein a maximum thickness of the light-shielding sheet in a direction of the optical axis is less than a maximum thickness of the spacer in the direction of the optical axis.

6. The optical lens according to claim 1, wherein the protrusion portion and the abutting surface are connected to each other.

7. The optical lens according to claim 1, wherein a shortest distance between the protrusion portion and the abutting surface is greater than 0.

8. An optical lens, comprising a light-shielding sheet and a spacer sequentially arranged along an optical axis from a first side to a second side, wherein no other element is disposed between the light-shielding sheet and the spacer, and each of the light-shielding sheet and the spacer comprises a first side surface facing the first side and a second side surface facing the second side, wherein
the second side surface of the light-shielding sheet comprises a first surface,
the first side surface of the spacer comprises an abutting surface and a connecting surface connected to each other, wherein the connecting surface has a protrusion portion,
a cross-sectional line of the abutting surface of the spacer in a radial direction is a straight line and abuts against the first surface of the light-shielding sheet, and
the optical lens satisfies the following conditional expression: $L/D1 \geq 1.020$, wherein L is a minimum distance between the abutting surface and the optical axis, and D1 is a minimum distance between a most protruding portion of the protrusion portion and the optical axis.

9. The optical lens according to claim 8, wherein the optical lens satisfies the following conditional expression: $D2/S \geq 20.000$, wherein D2 is a distance between an inner periphery of the spacer and a position of the light-shielding sheet closest to the optical axis in a direction perpendicular to the optical axis, the inner periphery is a position of the spacer closest to the optical axis, and S is a distance between the most protruding portion of the protrusion portion and the abutting surface in a direction of the optical axis.

10. The optical lens according to claim 8, wherein the spacer has an inner periphery located at a position closest to the optical axis, and the inner periphery and the connecting surface are connected to each other.

11. The optical lens according to claim 10, wherein a chamfer is provided between the protrusion portion and the inner periphery.

12. The optical lens according to claim 8, wherein the protrusion portion contacts the light-shielding sheet.

13. The optical lens according to claim 8, wherein the protrusion portion and the inner periphery are connected to each other.

14. The optical lens according to claim 8, wherein the optical lens further comprises a lens element, the lens element comprises a first side surface facing the first side and a second side surface facing the second side, and the light-shielding sheet is disposed between the lens element and the spacer.

15. The optical lens according to claim 14, wherein the second side surface of the light-shielding sheet further comprises a second surface connected to the first surface, and the first side surface of the light-shielding sheet comprises a third surface and a fourth surface connected to each other, wherein
a junction of the first surface and the second surface has an included angle, and
the third surface of the light-shielding sheet abuts against the second side surface of the lens element, an abutment between the third surface and the second side surface of the lens element falls on a second reference plane, a junction of the third surface and the fourth surface has the included angle.

16. The optical lens according to claim 15, wherein the second reference plane is perpendicular to the optical axis.

17. The optical lens according to claim 15, wherein the protrusion portion of the spacer abuts against the second surface of the light-shielding sheet.

18. The optical lens according to claim 15, wherein a shortest distance between the second surface and the protrusion portion is greater than 0.

19. The optical lens according to claim 15, wherein a portion of the fourth surface closest to the optical axis is located on one side of the second reference plane facing the first side, and a distance between the fourth surface and the lens element in a normal direction is greater than 0.

* * * * *